United States Patent
Fukuda et al.

(10) Patent No.: US 10,873,247 B2
(45) Date of Patent: Dec. 22, 2020

(54) ELECTRIC COMPRESSOR FOR VEHICLE, AND METHOD FOR MANUFACTURING ELECTRIC COMPRESSOR FOR VEHICLE

(71) Applicant: DENSO CORPORATION, Kariya (JP)

(72) Inventors: Takayuki Fukuda, Kariya (JP); Tsuyoshi Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/077,898

(22) PCT Filed: Jan. 25, 2017

(86) PCT No.: PCT/JP2017/002491
§ 371 (c)(1),
(2) Date: Aug. 14, 2018

(87) PCT Pub. No.: WO2017/145616
PCT Pub. Date: Aug. 31, 2017

(65) Prior Publication Data
US 2019/0089228 A1    Mar. 21, 2019

(30) Foreign Application Priority Data

Feb. 24, 2016  (JP) ................................. 2016-033496

(51) Int. Cl.
*H02K 11/02* (2016.01)
*H02K 11/33* (2016.01)
(Continued)

(52) U.S. Cl.
CPC .............. *H02K 11/02* (2013.01); *F04B 39/00* (2013.01); *F04B 39/06* (2013.01);
(Continued)

(58) Field of Classification Search
CPC .............................. H02K 11/022; H02K 11/33
(Continued)

(56) References Cited

U.S. PATENT DOCUMENTS

2013/0272907 A1    10/2013  Watanabe
2014/0294624 A1 *  10/2014  Suitou ................. F04C 18/0215
                                                         417/410.1
2016/0190894 A1     6/2016  Takabe

FOREIGN PATENT DOCUMENTS

DE   102011108066 A1 *  7/2012 ............. H02K 1/185
JP   S51059445 U        5/1976
(Continued)

OTHER PUBLICATIONS

Machine Translation WO2015005413 (Year: 2015).*
Machine Translation DE10201108066 (Year: 2012).*

*Primary Examiner* — Jose A Gonzalez Quinones
(74) *Attorney, Agent, or Firm* — Harness, Dickey & Pierce, P.L.C.

(57) ABSTRACT

An electric compressor for a vehicle includes a compressor case, an inverter circuit, an inverter case, and a lid that closes an opening of the inverter case. The electric compressor further includes a seal component interposed between the inverter case and the lid to seal between the inverter case and the lid. The electric compressor further includes a conductive component. The conductive component transmits an electromagnetic wave noise from the inverter case to at least one of the compressor case and the lid, the electromagnetic wave noise propagating from the inverter circuit to the inverter case when the inverter circuit provides the electric current through the electric motor.

8 Claims, 10 Drawing Sheets

(51) Int. Cl.
  *H02K 5/10* (2006.01)
  *H02K 5/20* (2006.01)
  *F04C 29/00* (2006.01)
  *F04B 39/06* (2006.01)
  *F04B 39/00* (2006.01)
  *F04C 15/00* (2006.01)

(52) U.S. Cl.
  CPC .......... *F04C 15/0057* (2013.01); *F04C 29/00* (2013.01); *H02K 5/10* (2013.01); *H02K 5/20* (2013.01); *H02K 11/33* (2016.01)

(58) Field of Classification Search
  USPC ..................................... 310/52, 75 R, 88, 89
  See application file for complete search history.

(56) References Cited

FOREIGN PATENT DOCUMENTS

| | | | | |
|---|---|---|---|---|
| JP | H05308198 | A | 11/1993 | |
| JP | 2009222009 | A | 10/2009 | |
| JP | 2012255381 | A | 12/2012 | |
| JP | 2014190179 | A | 10/2014 | |
| JP | 2015017577 | A | 1/2015 | |
| WO | WO-2015005413 | A1 * | 1/2015 | ............ F04C 27/008 |

* cited by examiner

THE OTHER SIDE ← AXIAL DIRECTION → ONE SIDE

THE OTHER SIDE ←→ ONE SIDE
AXIAL DIRECTION

THE OTHER SIDE ←——— AXIAL DIRECTION ———→ ONE SIDE

ELECTRIC COMPRESSOR FOR VEHICLE, AND METHOD FOR MANUFACTURING ELECTRIC COMPRESSOR FOR VEHICLE

CROSS REFERENCE TO RELATED APPLICATIONS

This application is a U.S. National Phase Application under 35 U.S.C. 371 of International Application No. PCT/JP2017/002491 filed on Jan. 25, 2017 and published in Japanese as WO/2017/145616 A1 on Aug. 31, 2017. This application is based on and claims the benefit of priority from Japanese Patent Application No. 2016-033496 filed on Feb. 24, 2016. The entire disclosures of all of the above applications are incorporated herein by reference.

TECHNICAL FIELD

The present disclosure relates to an electric compressor for a vehicle, and a method for manufacturing an electric compressor for a vehicle.

BACKGROUND ART

Conventionally, an electric compressor for a vehicle, described in, for example, Patent Literature 1, includes a compression mechanism which compresses refrigerant, an electric motor which drives the compression mechanism, an inverter which outputs a drive signal to the electric motor, a compressor case, and an inverter case.

The compressor case has a pipe shape housing the compression mechanism and the electric motor. The inverter case is arranged on one side of the compressor case in the axial direction. The inverter case has a pipe shape with a lid, and is formed to cover the inverter from one side in the axial direction.

PRIOR ART LITERATURES

Patent Literature

Patent Literature 1: JP 2009-222009 A

SUMMARY OF INVENTION

The present inventors study adopting an inverter case having an opening on one side in the axial direction to easily attach an inverter to the compressor case of Patent Literature 1. Furthermore, the present inventors examine a structure in which the opening is closed by a lid, after storing the inverter in the opening of the inverter case.

In this case, it is necessary to restrict water or foreign substance from entering inside the inverter case through a gap between the inverter case and the lid. For example, in a comparative example shown in FIG. 17, an inverter case 1a and a lid 2 are fastened together with a bolt 5 to a compressor case 4, in a state where a gasket 3 is inserted between the inverter case 1a and the lid 2.

The gasket 3 between the inverter case 1a and the lid 2 is a component which tightly seals a gap between the inverter case 1a and the lid 2.

However, when an inverter 1b outputs a drive signal to an electric motor, the inverter 1b generates an electromagnetic wave noise, and the electromagnetic wave noise is transmitted to the inverter case 1a. If the gasket 3 has electrical insulation properties, the electromagnetic wave noise cannot escape to the ground of a vehicle, while the lid 2 is connected to the ground.

It is an object of the present disclosure to provide an electric compressor for a vehicle and a method for manufacturing an electric compressor for a vehicle, by which an electromagnetic wave noise propagating from the inverter circuit to the inverter case is absorbed by the ground of a vehicle.

According to an aspect of the present disclosure, an electric compressor for a vehicle includes:

a compressor case made of a conductive metal material and having a pipe shape, the compressor case housing a compression mechanism which draws, compresses and discharges refrigerant, and an electric motor which drives the compression mechanism;

an inverter circuit which drives the electric motor with electric current;

an inverter case made of a conductive metal material and arranged on one side of the compressor case in an axial direction, the inverter case having a storage part that houses the inverter circuit and an opening open on one side in the axial direction;

a lid made of a conductive metal material, the lid closing the opening of the inverter case;

a seal component interposed between the inverter case and the lid to seal a gap between the inverter case and the lid; and a conductive component which transmits an electromagnetic wave noise from the inverter case to at least one of the compressor case and the lid, the electromagnetic wave noise propagating from the inverter circuit to the inverter case when the inverter circuit provides the electric current to the electric motor.

Accordingly, the electromagnetic wave noise propagating from the inverter circuit to the inverter case can be absorbed by the ground of vehicle by connecting the compressor case and the lid to the ground of vehicle.

DESCRIPTION OF EMBODIMENTS

Figure 1:
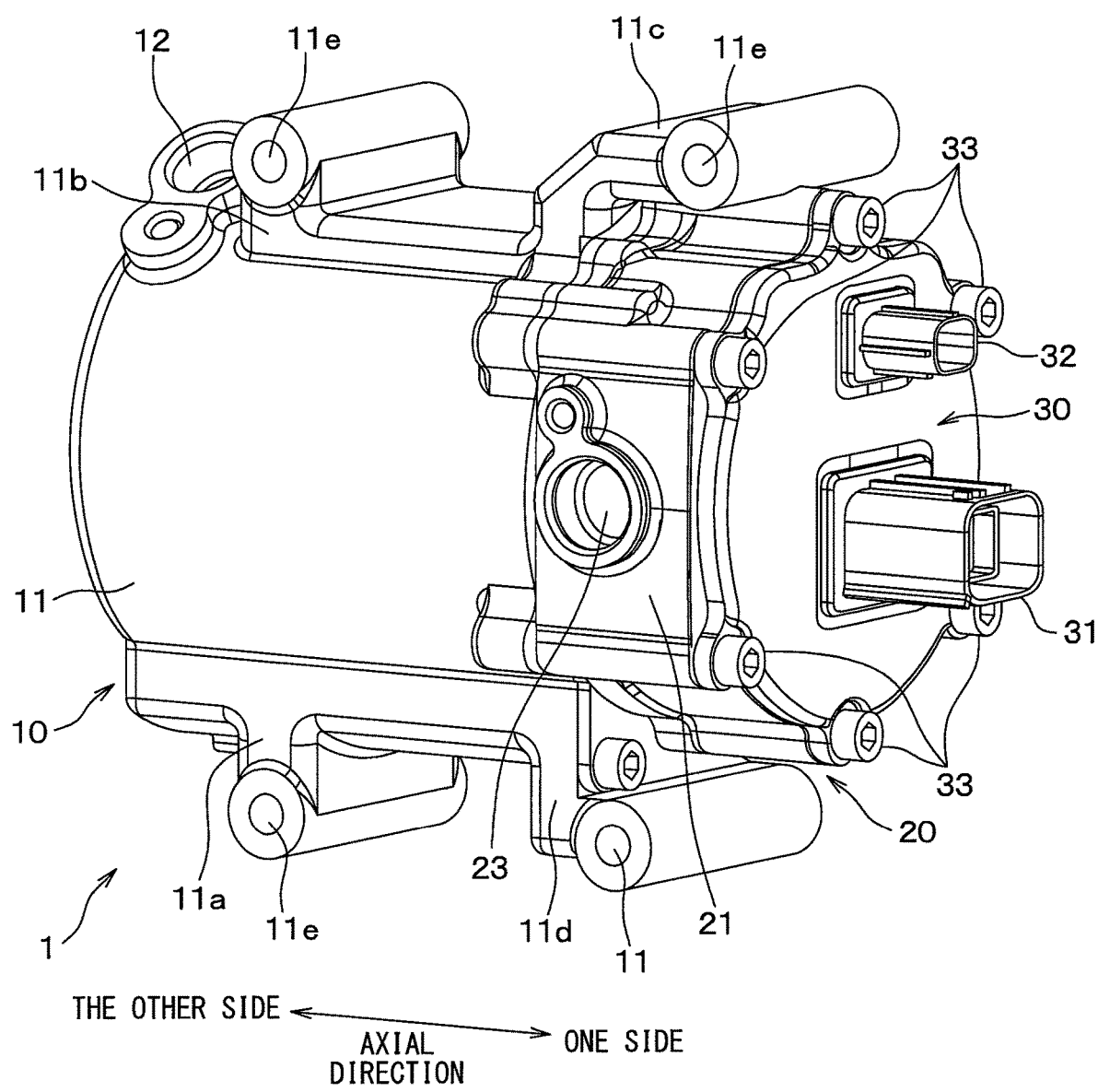
FIG. 1 is a perspective view illustrating an electric compressor for a vehicle according to a first embodiment.

Hereafter, embodiments of the present disclosure are described based on the drawings. Same or equivalent portions among respective embodiments below are labeled with same reference numerals in the drawings.

First Embodiment

Figure 2:
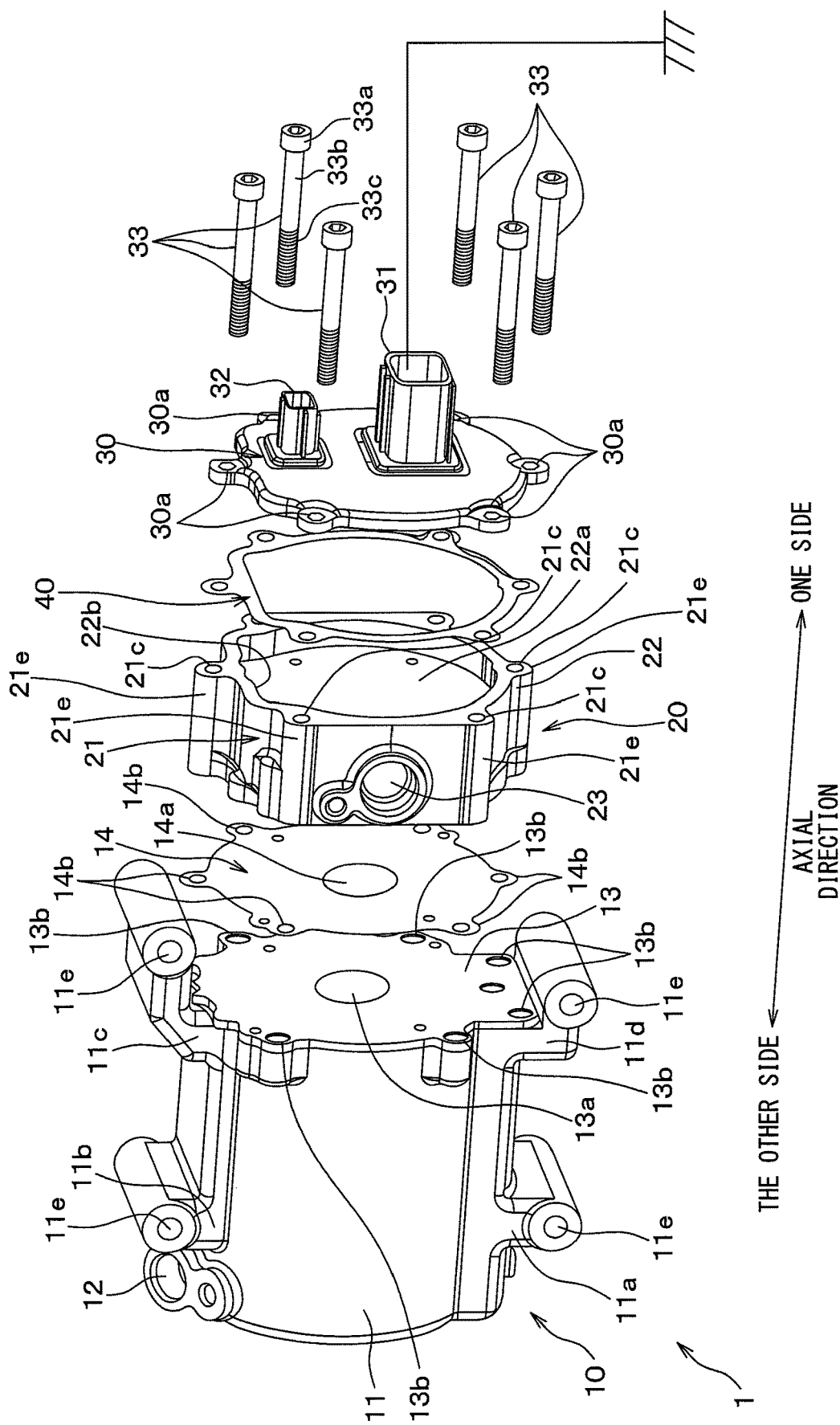
FIG. 2 is an exploded view illustrating the electric compressor of the first embodiment.
Figure 3:
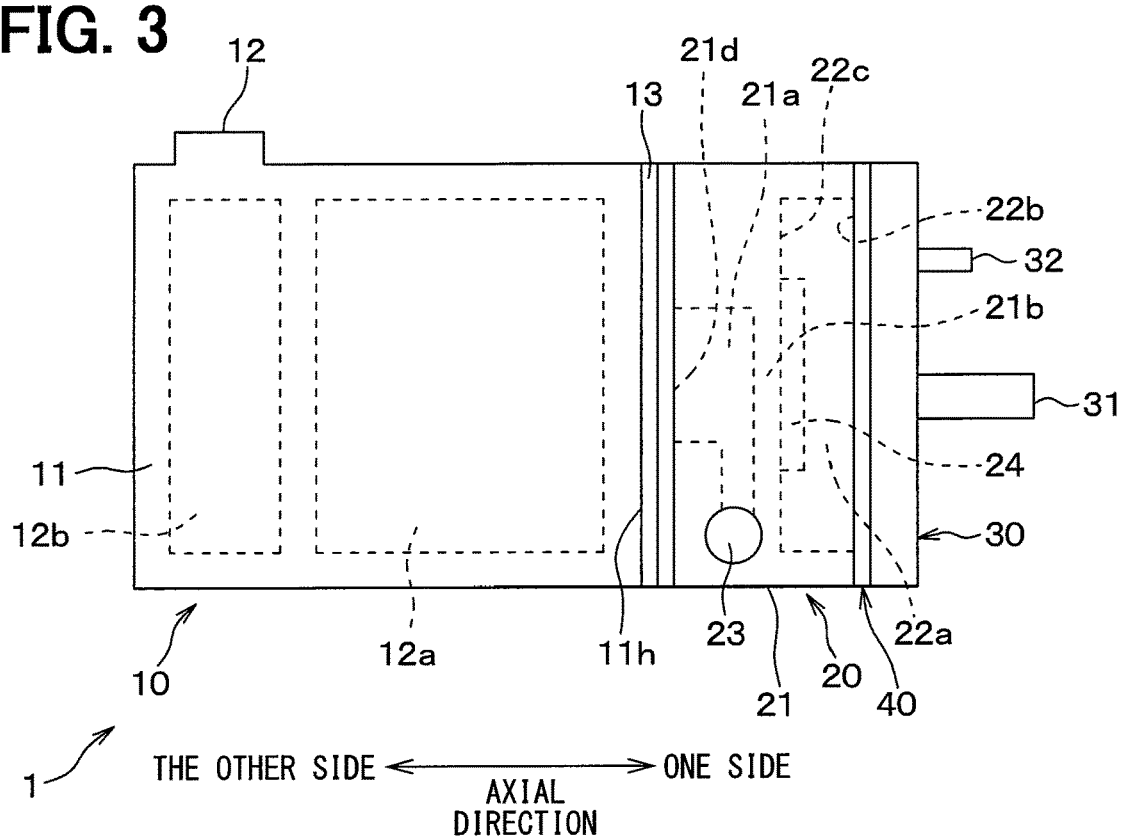
FIG. 3 is a schematic view illustrating a structure of the electric compressor of the first embodiment.

FIG. 1, FIG. 2, and FIG. 3 illustrate an electric compressor 1 for a vehicle according to a first embodiment.

The electric compressor 1 defines a refrigerating cycle equipment for a known in-vehicle air-conditioner in which refrigerant circulates, with a cooler, a reducing valve, and an evaporator. The electric compressor 1 is disposed in an engine room of a vehicle, and is fixed to an engine in the engine room.

As shown in FIG. 1 and FIG. 2, the electric compressor 1 includes a compressor part 10 and an inverter equipment 20. The compressor part 10 has a compressor case 11. The compressor case 11 has a pipe shape in which the other side in the axial direction is closed. A refrigerant discharge port 12 is formed in the other side of the compressor case 11 in the axial direction.

The compressor case 11 has legs 11a, 11b, 11c, and 11d. A through hole 11e is defined in the leg 11a, 11b, 11c, 11d, through which a bolt (not shown) passes. Four bolts passing through the respective legs 11a, 11b, 11c, and 11d are made of conductive metal material.

In this embodiment, the four bolts fix the compressor case 11 to the engine. As a result, the four bolts are in contact with the compressor case 11, and the four bolts are in contact with the engine. For this reason, the four bolts are configured to achieve electrical connection between the compressor case 11 and the engine. Thereby, the electrical connection between the compressor case 11 and the engine is realized through the bolts.

The engine is connected to the ground of vehicle. Therefore, the compressor case 11 is connected to the ground of vehicle through the four bolts and the engine.

The leg 11a is arranged on the other side in the axial direction, in the compressor case 11, and is located on the lower side in FIG. 1. The leg 11b is arranged on the other side in the axial direction, in the compressor case 11, and is located on the upper side in FIG. 1.

The leg 11c is arranged on the one side in the axial direction, in the compressor case 11, and is located on the upper side in FIG. 1. The leg 11c is formed to cover the inverter case 21 of the inverter equipment 20 from the upper side in FIG. 1.

The leg 11d is arranged on the one side in the axial direction, in the compressor case 11, and is located on the lower side in FIG. 1. The leg 11d is formed to cover the inverter case 21 of the inverter equipment 20 from the lower side in FIG. 1.

As shown in FIG. 3, the compressor case 11 houses the electric motor 12a and the compression mechanism 12b. The electric motor 12a is stored in the compressor case 11, and drives the compression mechanism 12b. The electric motor 12a of this embodiment configures a synchronous three-phase alternating current motor.

The compression mechanism 12b compresses refrigerant drawn from the refrigerant inlet port 23, and discharges the refrigerant towards the cooler from the refrigerant discharge port 12. The compression mechanism 12b of this embodiment may be a vane type compression mechanism or a scroll type compression mechanism.

The opening 11h is formed on one side of the compressor case 11 in the axial direction. The disk-like plate 13 is arranged on one side of the compressor case 11 in the axial direction. The plate 13 is arranged to close the opening 11h of the compressor case 11. The refrigerant channel 13a is defined in the plate 13 to pass through the plate 13 in the axial direction.

The refrigerant channel 13a is used for introducing the refrigerant from the refrigerant channel 21a of the inverter case 21 toward the compression mechanism 12b. The plate 13 has plural through holes 13b passing through the plate 13 in the axial direction, around the perimeter side. The through holes 13b are used for fastening the plural bolts 33 on the compressor case 11. The bolts 33 of this embodiment are fabricated from conductive metal material such as iron.

The gasket 14 having a disk shape shown in FIG. 2 is arranged to the other side of the plate 13 in the axial direction. The gasket 14 includes a thin board rubber which is an elastic component having electrical insulation properties. The gasket 14 electrically insulates the compressor case 11 and the inverter case 21 from each other.

The gasket 14 has a hole part 14a passing through in the axial direction. The hole part 14a defines the refrigerant channel introducing the refrigerant from the refrigerant channel 21a of the inverter case 21 to the compression mechanism 12b. Furthermore, the gasket 14 has plural through holes 14b passing through in the axial direction, around the perimeter side.

The inverter equipment 20 is arranged on one side of the gasket 14 in the axial direction. The inverter equipment 20 includes the inverter case 21. The inverter case 21 is arranged on one side of the compressor part 10 in the axial direction. The inverter case 21 is formed in the shape of a short pipe. The inverter case 21 is arranged so that the axis is in agreement with the axis of the compressor case 11.

The inverter case 21 includes the side wall 22 formed annularly to have the same axis. As shown in FIG. 1 and FIG. 2, the refrigerant inlet port 23 is defined in the side wall 22. The side wall 22 forms the storage part 22a with the opening 22b opened to one side in the axial direction. The side wall 22 is an opening formation part of the inverter case 21 which forms the opening 22b. The storage part 22a of the inverter case 21 is formed to have a bottom 22c recessed from the opening 22b on the other side in the axial direction.

As shown in FIG. 3, the refrigerant channel 21a of the inverter cases 21 is located on the other side of the bottom 22c in the axial direction. The refrigerant channel 21a is defined by the body part 21b of the inverter case 21. The body part 21b is a portion made of conductive metal material which configures the inverter case 21. The refrigerant channel 21a introduces the refrigerant from the refrigerant inlet port 23 toward the compressor case 11. The refrigerant exit 21*d* of the refrigerant channel 21*a* is open to the other side in the axial direction, in the inverter case 21.

The inverter circuit 24 is arranged in the storage part 22*a* of the inverter case 21. The inverter circuit 24 of this embodiment is an electronic device in which an electric circuit which drives the electric motor 12*a* is mounted on a substrate. The inverter circuit 24 is fixed to the bottom 22*c* in the storage part 22*a*. The inverter case 21 has plural through-hole formation parts 21*e* to form the through holes 21*c* passing through in the axial direction. Each of the through-hole formation parts 21*e* is projected outward in the radial direction.

As shown in FIG. 1, the inverter equipment 20 includes the lid 30. The lid 30 is formed to close the opening 22*b* of the inverter case 21. The lid 30 has plural through holes 30*a* passing through in the axial direction, around the perimeter side of the lid 30. The connectors 31 and 32 are connected to the lid 30. The connectors 31 and 32 are connected to the inverter circuit 24.

The plural bolts (namely, joint bolts) 33 pass through the respective through holes 30*a* of the lid 30, the respective through holes 40*b* of the gasket 40, the respective through holes 21*c* of the inverter case 21, the respective through holes 14*b* of the gasket 14, and the respective through holes 13*b* of the plate 13. The bolts 33 are fixed to the compressor case 11 in this state.

The lid 30, the inverter case 21, the gaskets 40 and 14, and the plate 13 are fixed to the compressor case 11 with the bolts 33.

Figure 4:
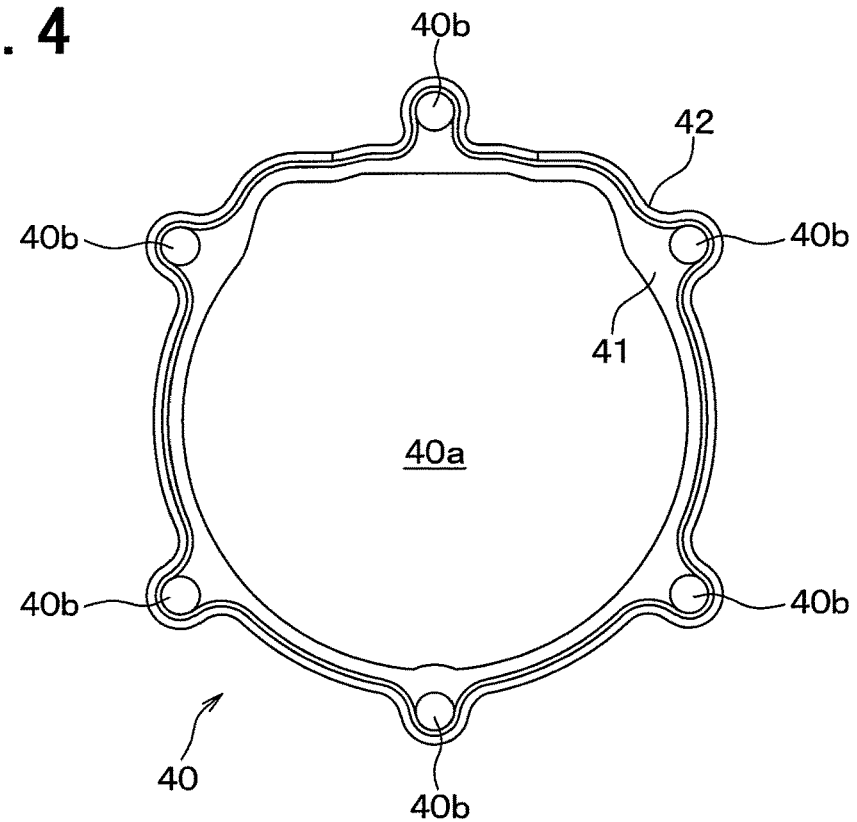
FIG. 4 is a front view illustrating a gasket of FIG. 2.

The gasket 40 is inserted between the lid 30 and the inverter case 21. As shown in FIG. 4, the gasket 40 includes an electrical connection part 41 and a rubber part 42. The electrical connection part 41 is formed in a ring shape with a through hole 40*a* passing through in the axial direction, and defines the electrical connection between the lid 30 and the inverter case 21. Thereby, the electrical connection between the lid 30 and the inverter case 21 is realized by the electrical connection part 41. The electrical connection part 41 is made of metal and corresponds to a conductive component. The electrical connection part 41 has plural through holes 40*b* passing through in the axial direction. The through holes 40*b* are arranged around the perimeter side of the through hole 40*a* in the circumference direction. The through hole 40*a* corresponds to an introductory passage for introducing the refrigerant from the refrigerant channel 21*d* of the inverter case 21 to the compression mechanism within the compressor case 11.

The rubber part 42 is annularly formed of an elastic component such as rubber having electrical insulation properties. The elastic component having the electrical insulation properties corresponds to an electrical-insulation-properties material. The rubber part 42 is disposed around the perimeter side of the electrical connection part 41. The rubber part 42 seals a gap between the side wall 22 of the inverter case 21 which forms the opening 22*b* and the lid 30. That is, the rubber part 42 tightly seals a gap between the inverter case 21 and the lid 30. The rubber part corresponds to a seal component.

The rubber part 42 and the electrical connection part 41 are fixed by joining the rubber part 42 and the electrical connection part 41. As the technique of joining the rubber part 42 and the electrical connection part 41, for example, a welding is used in this embodiment.

The connector 31 of this embodiment includes plural connector terminals. The plural connector terminals are connected to the plus electrode of a high-voltage power supply and the ground of vehicle through other connectors and harness, respectively.

The connector terminal connected to the ground of vehicle, among the plural connector terminals of this embodiment, is connected to the lid 30. Thereby, the lid 30 is connected to the ground of vehicle through the connector 31. Hereafter, for easy explanation, the connector terminal connected to the ground of vehicle and connected to the lid 30 is called as a connector terminal for grounding among the plural connector terminals.

In this embodiment, the compressor case 11, the plate 13, the electrical connection part 41 of the gasket 40, the inverter case 21, and the lid 30 are made of conductive metal material such as aluminum, stainless steel (namely, SUS), and iron.

Figure 5:
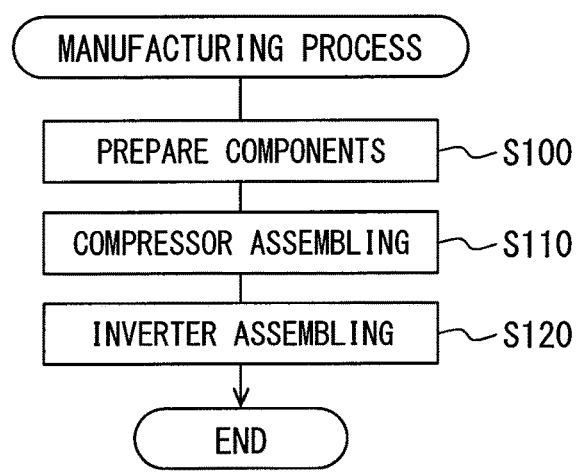
FIG. 5 is a flow chart illustrating a method of manufacturing the electric compressor of FIG. 1.

Next, the production method of the electric compressor 1 of this embodiment is explained with reference to FIG. 5.

First, in Step 100 which is the first process, the compressor case 11, the electric motor 12*a*, the compression mechanism 12*b*, the plate 13, the gasket 14, the inverter case 21, the lid 30, the gasket 40, and plural bolts 33 are prepared.

In Step 110 which is the second process, the electric motor 12*a* and the compression mechanism 12*b* are placed in the compressor case 11 to assemble the compressor part 10.

In Step 120 which is the third process, the inverter circuit 24 is fixed in the inverter case 21, and the plate 13 and the gasket 14 are arranged between the compressor case 11 and the inverter case 21. Furthermore, the gasket 40 and the lid 30 are arranged to one side of the inverter case 21 in the axial direction.

In addition, the plural bolts 33 are made to pass through the through holes 21*c* of the lid 30, the through holes 40*a* of the gasket 40, the through holes 21*c* of the inverter case 21, the through holes 14*b* of the gasket 14, and the through holes 13*b* of the plate 13. In this state, the plural bolts 33 are tightened to the compressor case 11.

Thereby, the lid 30, the gasket 40, the inverter case 21, the gasket 14, and the plate 13 are tightened with the bolts 33 to the compressor case 11. For this reason, the lid 30, the gasket 40, the inverter case 21, the gasket 14, and the plate 13 are fixed with the bolts 33 to the compressor case 11.

Meanwhile, the gasket 14 and the plate 13 are inserted between the compressor case 11 and the inverter case 21. At this time, the gasket 14 is elastically deformed and made in the compressed state between the inverter case 21 and the plate 13, and tightly seals gap between the inverter case 21 and the plate 13.

Furthermore, the gasket 40 is inserted between the side wall 22 of the inverter case 21, and the lid 30. At this time, the electrical connection part 41 is in contact with the side wall 22 of the inverter case 21, and the electrical connection part 41 is in contact with the lid 30. The rubber part 42 is elastically deformed and made in the compressed state between the side wall 22 of the inverter case 21 and the lid 30, and tightly seals gap between the side wall 22 of the inverter case 21 and the lid 30.

Accordingly, the lid 30, the gasket 40, the inverter case 21, the gasket 14, and the plate 13 can be assembled to the compressor case 11.

Next, the operation of the electric compressor 1 of this embodiment is explained.

First, the inverter circuit 24 is supplied with the direct-current electric power from the high-voltage power supply, and three-phase alternating current flows through the electric motor 12*a*. In connection with this, the electric motor 12*a* outputs a rotation torque to the compression mechanism 12*b* based on the three-phase alternating current flowing from the inverter circuit 24. For this reason, the compression mechanism 12b is rotated by the electric motor 12a to compress refrigerant.

In connection with this, the refrigerant flowing from the evaporator side flows in the refrigerant inlet port 23, the refrigerant channel 21a, the hole part 14a of the gasket 14, and the refrigerant channel 13a of the plate 13, and is drawn toward the compression mechanism 12b within the compressor case 11. The compression mechanism 12b compresses the refrigerant, and discharges the high-temperature high-pressure refrigerant to the cooler side from the refrigerant discharge port 12.

At this time, while the inverter circuit 24 generates heat when the three-phase alternating current flows through the electric motor 12a, the inverter circuit 24 is cooled with the refrigerant which flows inside of the refrigerant channel 21a.

Furthermore, when the three-phase alternating current flows through the electric motor 12a, an electromagnetic wave noise is generated by the inverter circuit 24. The electromagnetic wave noise propagates through the inverter case 21. However, the electromagnetic wave noise is transmitted from the inverter case 21 through the electrical connection part 41 of the gasket 40, the lid 30, the connector terminal for grounding of the connector 31, and the harness. Finally, the electromagnetic wave noise can be absorbed by the ground of vehicle.

According to the present embodiment, the electric compressor 1 includes the compressor case 11 housing the compression mechanism 12b and the electric motor 12a, and the compressor case 11 is connected to the ground of vehicle. The electric compressor 1 includes the inverter case 21 which forms the storage part 22a housing the inverter circuit 24 through the opening 22b. The inverter case 21 is connected to the ground of vehicle and is made of conductive metal material.

The electric compressor 1 includes the lid 30 and the gasket 40. The lid 30 is made of conductive material and closes the opening 22b of the inverter case 21. The gasket 40 has the electrical connection part 41 and the rubber part 42. The electrical connection part 41 is made of conductive metal material, and achieves the electrical connection between the lid 30 and the inverter case 21. The rubber part 42 is annularly formed of, for example, rubber which is an elastic component having electrical insulation properties, and tightly seals gap between the lid 30 and the side wall 22 of the inverter case 21 which forms the opening 22b.

When the inverter circuit 24 supplies the three-phase alternating current through the electric motor 12a, the electromagnetic wave noise propagates through the inverter case 21 from the inverter circuit 24. The electromagnetic wave noise from the inverter case 21 is absorbed by the ground of vehicle through the electrical connection part 41 of the gasket 40, the lid 30, the connector terminal for grounding of the connector 31, and the harness.

Accordingly, the electromagnetic wave noise propagating through the inverter case 21 from the inverter circuit 24 can be absorbed by the ground of vehicle without a gasket made of conductive rubber.

It is also possible to replace the gasket 40 which consists of the electrical connection part 41 and the rubber part 42 with a gasket made of conductive rubber (henceforth, referred to conductive rubber gasket).

In this case, it is necessary to use the plural bolts 33 to tighten the lid 30, the conductive rubber gasket, the inverter case 21, the gasket 14, and the plate 13 together to the compressor case 11.

If the axial tension fastening the plural bolts 33 to the compressor case 11 is insufficient, the conductive rubber gasket is elastically deformed, and the position of the inverter case 21 becomes unstable to the compressor case 11. In this case, it becomes impossible to seal gap between the compressor case 11 and the inverter case 21 by the gasket 14.

Moreover, the conductive rubber gasket is fully elastically deformed between the lid 30 and the inverter case 21 by tightening the plural bolts 33 to the compressor case 11. In this case, since the form of the conductive rubber gasket is stabilized, the position of the inverter case 21 can be stabilized to the compressor case 11. For this reason, the sealing can be secured between the compressor case 11 and the inverter case 21. However, excessive axial tension is needed for fastening the bolts 33 to the compressor case 11 in this case.

On contrary, according to this embodiment, the gasket 40 has the electrical connection part 41 made of conductive metal material, and the electrical connection part 41 of the gasket 40 is inserted between the lid 30 and the inverter case 21.

Compared with the conductive rubber gasket, the electrical connection part 41 of the gasket 40 is hardly elastically deformed. Therefore, when fastening the bolts 33 to the compressor case 11, the position of the inverter case 21 can be stabilized to the compressor case 11 with small axial tension. Therefore, the sealing can be easily secured between the compressor case 11 and the inverter case 21.

Second Embodiment

In the first embodiment, the electromagnetic wave noise propagating through the inverter case 21 is absorbed by the ground of vehicle, due to the electrical connection part 41 of the gasket 40. Alternatively, in a second embodiment, the electrical connection part 41 of the gasket 40 is replaced with a bolt 50 which fastens the inverter case 21 and the compressor case 11. The second embodiment is described with reference to FIG. 6 and FIG. 7.

Figure 6:
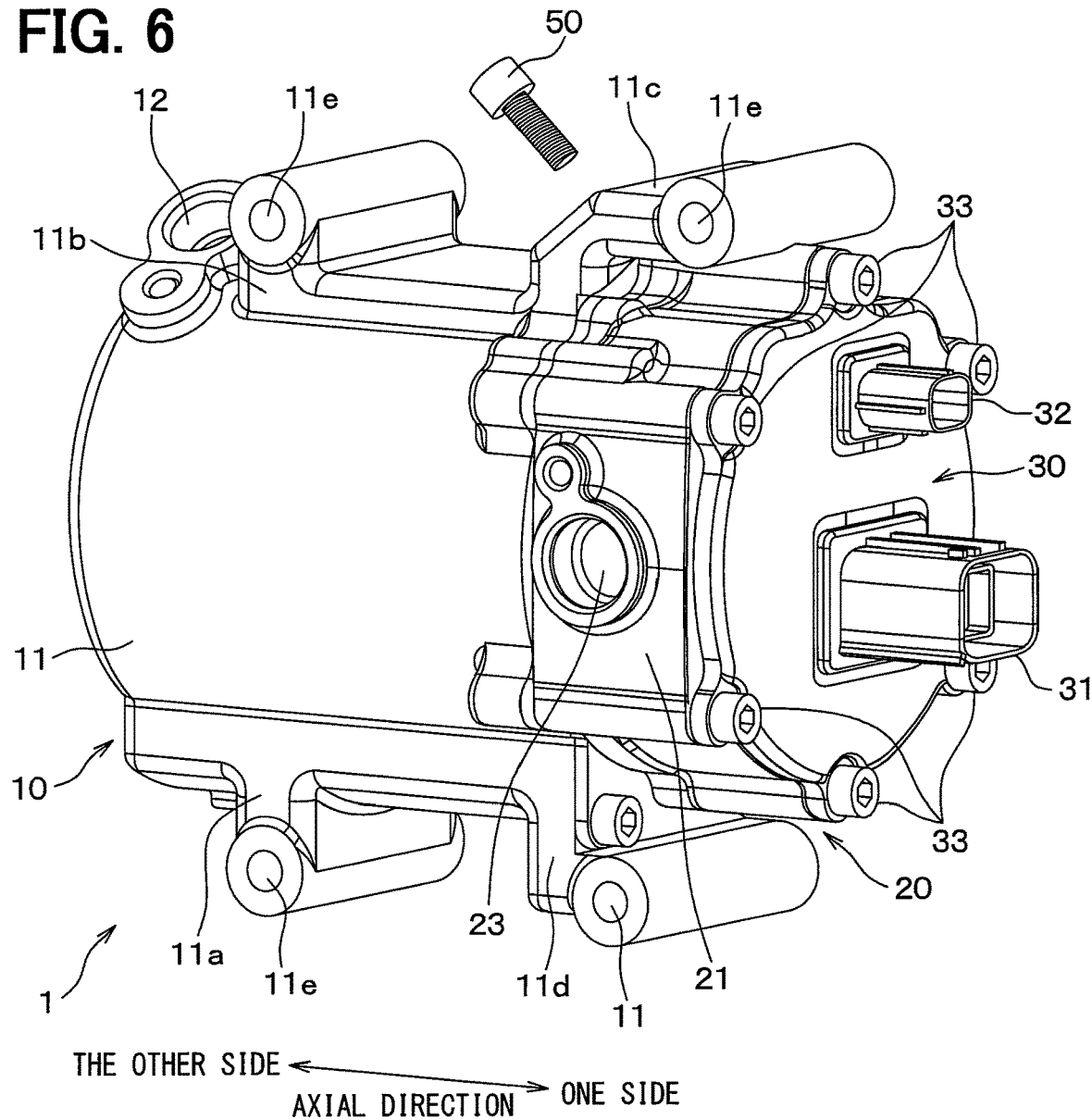
FIG. 6 is a perspective view illustrating an electric compressor for a vehicle according to a second embodiment.
Figure 7:
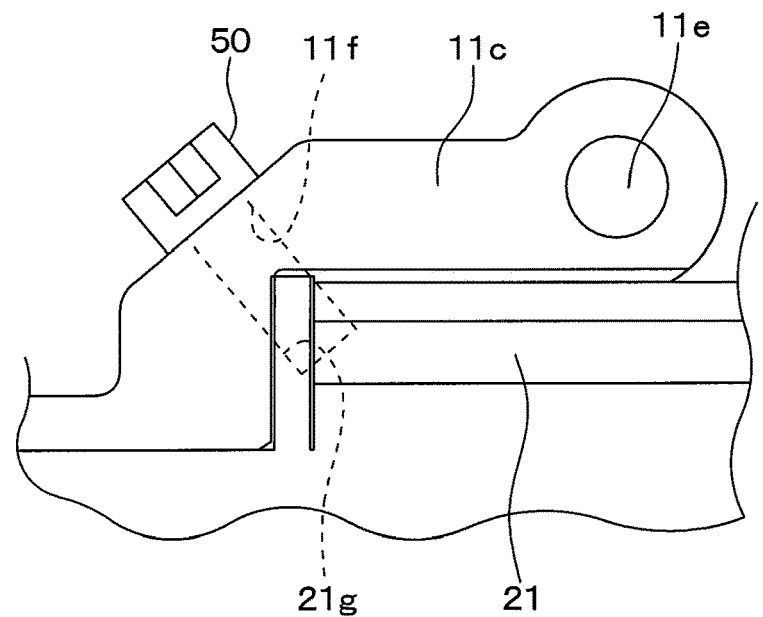
FIG. 7 is an enlarged view of the electric compressor of the second embodiment.

The electric compressor 1 of this embodiment is defined by adding the bolt 50 to the electric compressor 1 of the first embodiment. As shown in FIG. 6 and FIG. 7, the bolt 50 is an electrical connection bolt fastened to a spiral hole 21g of the inverter case 21 through a spiral hole 11f of the leg 11c of the compressor case 11. The bolt 50 is made of metal and corresponds to a conductive component.

Figure 8:
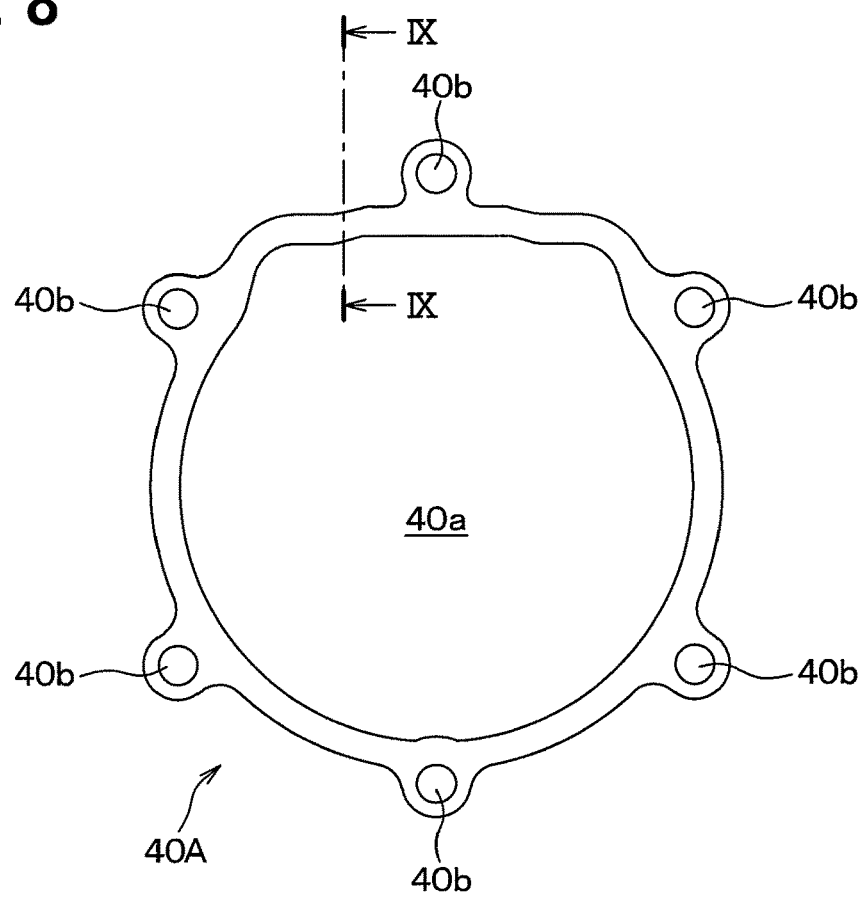
FIG. 8 is a front view illustrating a gasket in the second embodiment.
Figure 9:
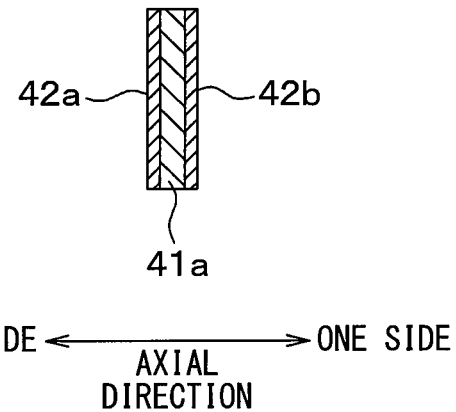
FIG. 9 is a sectional view taken along a line IX-IX in FIG. 8.

In this embodiment, the gasket 40 of FIG. 2 is replaced with a gasket 40A shown in FIG. 8 and FIG. 9.

The gasket 40A includes a metal support part 41a and rubber parts 42a and 42b. The rubber parts 42a and 42b correspond to a seal component. The metal support part 41a is a metal component made of conductive metal material such as aluminum. The metal support part 41a is formed in a ring shape surrounding the opening 22b of the inverter case 21. Each of the rubber parts 42a and 42b is made of rubber having electrical insulation properties, and is formed in a ring shape surrounding the opening 22b of the inverter case 21 made of metal. The rubber part 42a is disposed on the other side of the metal support part 41a in the axial direction. The rubber part 42b is disposed on the one side of the metal support part 41a in the axial direction.

The gasket 40A of this embodiment electrically insulates the inverter case 21 and the lid 30 from each other.

Figure 10:
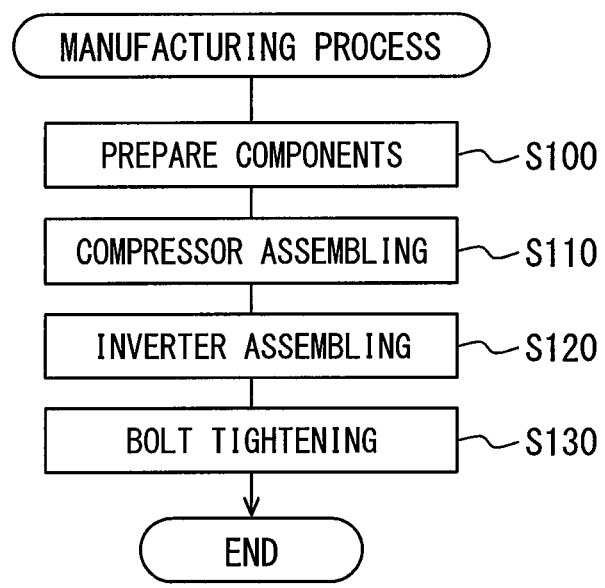
FIG. 10 is a flow chart illustrating a method of manufacturing the electric compressor of FIG. 6.

Next, the production method of the electric compressor 1 of this embodiment is explained with reference to FIG. 10. In FIG. 10, the explanation is omitted regarding the same processing step as FIG. 5.

First, in Steps 100, 110, and 120, the first process, the second process, and the third process are carried out similarly to the first embodiment. Thereby, the compression mechanism 12b and the electric motor 12a are placed in the compressor case 11. The lid 30, the gasket 40, the inverter case 21, the gasket 14, the inverter circuit 24, and the plate 13 are attached to the compressor case 11 using plural bolts 33.

Then, in the fourth process Step 140, the bolt 50 is fastened to the spiral hole 21g of the inverter case 21 through the spiral hole 11f of the leg 11c of the compressor case 11. The compressor case 11 and the inverter case 21 are connected with each other by the bolt 50.

Therefore, the bolt 50 can be in contact with the compressor case 11, and the bolt 50 can be in contact with the inverter case 21. For this reason, the electrical connection between the compressor case 11 and the inverter case 21 can be achieved through the bolt 50.

In this embodiment, the rubber part 42a is interposed between the metal support part 41a which is an electrical connection part and the side wall 22 of the inverter case 21. The rubber part 42a is elastically deformed into the compressed state to tightly seal gap between the metal support part 41a and the side wall 22 of the inverter case 21. Furthermore, the rubber part 42b is interposed between the metal support part 41a and the lid 30. The rubber part 42b is elastically deformed into the compressed state to tightly seal gap between the metal support part 41a and the lid 30. Thus, the gasket 40A can seal gap between the side wall 22 of the inverter case 21 and the lid 30.

In the electric compressor 1 of this embodiment, when the inverter circuit 24 supplies the three-phase alternating current flowing through the electric motor 12a, an electromagnetic wave noise propagates through the inverter case 21 from the inverter circuit 24. The electromagnetic wave noise from the inverter case 21 is absorbed by the ground of vehicle through the bolt 50, the compressor case 11, and the engine of the vehicle.

According to the present embodiment, in the electric compressor 1, the bolt 50 fixes the leg 11c of the compressor case 11 and the inverter case 21 together. Therefore, the compressor case 11 and the inverter case 21 are electrically connected with each other by the bolt 50. Thereby, the electromagnetic wave noise propagating through the inverter case 21 from the inverter circuit 24 can be transmitted from the inverter case 21 to the ground of vehicle through the bolt 50, the compressor case 11, and the engine.

Accordingly, the electric compressor 1 can be offered, in which the electromagnetic wave noise propagating through the inverter case 21 from the inverter circuit 24 can be absorbed by the ground of vehicle without using a gasket made of conductive rubber. Moreover, the production method of such an electric compressor 1 for a vehicle can be offered.

In this embodiment, the gasket 40A has the metal support part 41a between the rubber part 42a and the rubber part 42b. The metal support part 41a is inserted between the lid 30 and the inverter case 21. For this reason, compared with the gasket made of conductive rubber, the metal support part 41a is hardly elastically deformed. Therefore, the same effect as the first embodiment is acquired, such that excessive axial tension for fastening the plural bolts 33 to the compressor case 11 is not needed.

Third Embodiment

In the second embodiment, the bolt 50 is used to make the ground of vehicle to absorb the electromagnetic wave noise propagating through the inverter case 21. Alternatively, in a third embodiment, the bolt 33 for fastening the inverter case 21 and the lid 30 onto the compressor case 11 is used. The third embodiment is described with reference to FIG. 11, FIG. 12A, FIG. 12B, and FIG. 13.

Figure 11:
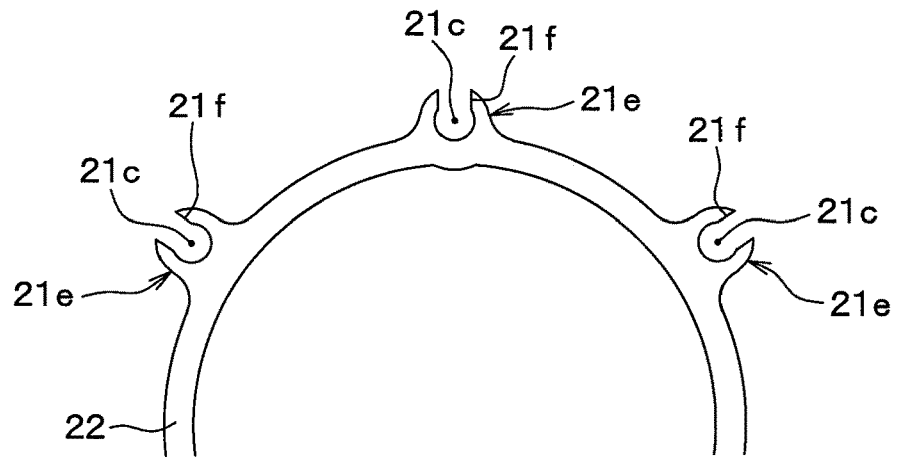
FIG. 11 is a view illustrating a compressor case of an electric compressor for a vehicle according to a third embodiment, which is seen from one side in the axial direction.

As shown in FIG. 11, each of the plural through-hole formation parts 21e of the compressor case 11 has an opening 21f open outward in the radial direction. In this embodiment, the opening 21f continuously extends in the axial direction.

In this embodiment, the gasket 40 of FIG. 2 is replaced with the gasket 40A shown in FIG. 8 and FIG. 9, similarly to the second embodiment.

The electric compressor 1 of this embodiment has the same configuration as the electric compressor 1 of the first embodiment, except for the plural through-hole formation parts 21e of the compressor case 11 and the gasket 40A, the explanation of which is omitted.

Figure 12A:
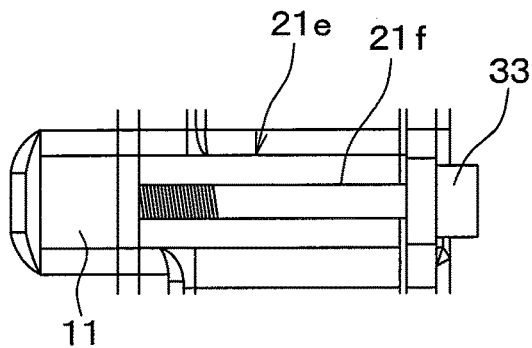
FIG. 12A is an enlarged view illustrating a through-hole formation part of a compressor case and a bolt seen from a radially outer side before a crimping.
Figure 12B:
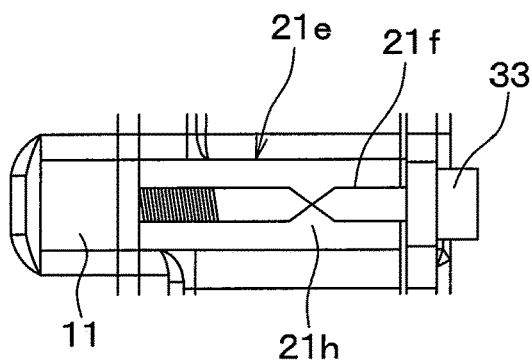
FIG. 12B is an enlarged view illustrating the through-hole formation part of the compressor case and the bolt seen from the radially outer side after the crimping.
Figure 13:
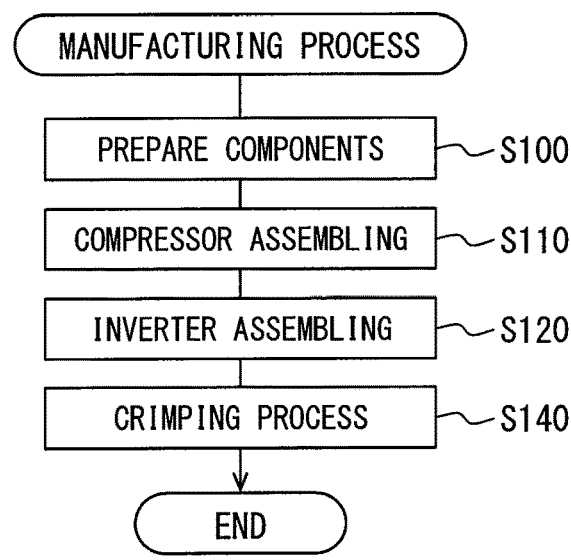
FIG. 13 is a flow chart illustrating a method of manufacturing the electric compressor in the third embodiment.

Next, the production method of the electric compressor 1 of this embodiment is explained with reference to FIG. 12A, FIG. 12B, and FIG. 13. The explanation is omitted for the same processing step between FIG. 13 and FIG. 5.

First, in Steps 100, 110, and 120, the first process, the second process, and the third process are carried out like the second embodiment, respectively. Thereby, the lid 30, the gasket 40, the inverter case 21, the gasket 14, the inverter circuit 24, and the plate 13 are attached to the compressor case 11 using plural bolts 33.

The lid 30, the gasket 40A, the inverter case 21, the gasket 14, and the plate 13 are tightened together by the plural bolts 33 to the compressor case 11. Thereby, the plural bolts 33 are in contact with the compressor case 11, and the plural bolts 33 are in contact with the lid 30.

Then, in the fourth process Step 140, each of the through-hole formation parts 21e of the compressor case 11 is plastically deformed by applying force, such that the through-hole formation part 21e and the corresponding bolt 33 are in contact with each other.

That is, the through-hole formation part 21e is plastically deformed and fixed to the bolt 33, for each of the bolts 33. Thereby, the through-hole formation part 21e is deformed from the state shown in FIG. 12A into the state shown in FIG. 12B. Thereby, a swaging holding part 21h is formed for each of the bolts 33, at which the through-hole formation part 21e is in contact with the bolt 33.

Thereby, the electrical connection between the compressor case 11 and the inverter case 21 is defined through the plural bolts 33. Furthermore, the electrical connection between the lid 30 and the inverter case 21 is defined through the plural bolts 33. The plural bolts 33 are made of metal, and correspond to a conductive component.

According to the electric compressor 1 of this embodiment, when the inverter circuit 24 supplies the three-phase alternating current flowing through the electric motor 12a, the electromagnetic wave noise propagates through the inverter case 21 from the inverter circuit 24. The electromagnetic wave noise is transmitted from the inverter case 21 to the ground of vehicle through the swaging holding part 21h for each of the bolts 33, the bolts 33, the compressor case 11, and the engine of the vehicle.

Alternatively, the electromagnetic wave noise propagating through the inverter case 21 from the inverter circuit 24 is transmitted from the inverter case 21 to the ground of vehicle through the swaging holding part 21h for each of the bolts 33, the bolts 33, and the lid 30.

Thus, the electric compressor 1 can be offered without using a gasket made of conductive rubber, such that the electromagnetic wave noise propagating through the inverter case 21 from the inverter circuit 24 is absorbed by the ground of vehicle. Moreover, the production method of such an electric compressor 1 can be offered.

In this embodiment, the gasket 40A having the metal support part 41a between the rubber parts 42a and 42b is adopted like the second embodiment. The same effect as the second embodiment is acquired.

Fourth Embodiment

In the second embodiment, the bolt 50 is used such that the electromagnetic wave noise propagating through the inverter case 21 is absorbed by the ground of vehicle. Alternatively, in this embodiment, the inverter case 21 and the compressor case 11 are joined with each other, and the inverter case 21 and the lid 30 are joined with each other. The fourth embodiment is described with reference to FIG. 14 and FIG. 15.

In the electric compressor 1 of this embodiment, a junction S1 is formed as a welding part at which the inverter case 21 and the compressor case 11 are joined by welding. A junction S2 is formed as a welding part at which the inverter case 21 and the lid 30 are joined by welding.

In this embodiment, like the second embodiment, the gasket 40A shown in FIG. 8 and FIG. 9 is used instead of the gasket 40 of FIG. 2.

Figure 15:
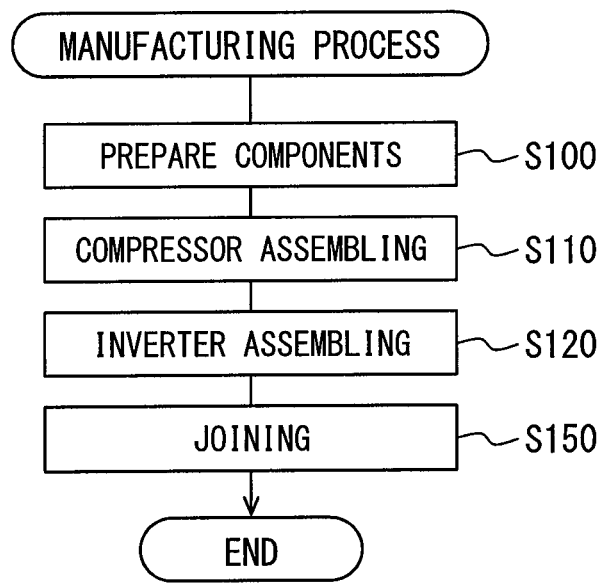
FIG. 15 is a flow chart illustrating a method of manufacturing the electric compressor in the fourth embodiment.

Next, the production method of the electric compressor 1 of this embodiment is explained with reference to FIG. 15. In FIG. 15, the explanation is omitted, regarding the same processing step as FIG. 5.

First, in Steps 100, 110, and 120, the first process, the second process, and the third process are carried out like the first embodiment. Thereby, the lid 30, the gasket 40, the inverter case 21, the gasket 14, the inverter circuit 24, and the plate 13 are attached to the compressor case 11 using plural bolts 33.

Then, in the fourth process Step 140, the inverter case 21 and the compressor case 11 are joined with each other by welding. The inverter case 21 and the lid 30 are joined with each other by welding. Thereby, the junctions (namely, welding parts) S1 and S2 can be formed.

In the electric compressor 1 of this embodiment, when the inverter circuit 24 supplies the three-phase alternating current flowing through the electric motor 12a, the electromagnetic wave noise propagating through the inverter case 21 from the inverter circuit 24 is transmitted from the junction S1 to the engine through the compressor case 11.

Alternatively, the electromagnetic wave noise propagating through the inverter case 21 is transmitted from the compressor case 11 to the ground of vehicle through the junction S2 and the lid 30.

Accordingly, the electromagnetic wave noise propagating from the inverter circuit 24 to the inverter case 21 can be absorbed by the ground of vehicle through the junction S1, S2, without using a gasket made of conductive rubber.

In this embodiment, the gasket 40A having the metal support part 41a between the rubber parts 42a and 42b is adopted like the second embodiment. The same effect as the second embodiment is acquired.

Fifth Embodiment

In the third embodiment, the plural through-hole formation parts 21e of the compressor case 11 are plastically deformed, such that the plural through-hole formation parts 21e and the plural bolts 33 are in contact with each other.

Alternatively, in a fifth embodiment, the plural through-hole formation parts 21e of the compressor case 11 are elastically deformed, such that the plural through-hole formation parts 21e and the plural bolts 33 are in contact with each other.

The cross-section area of the intermediate part 33b of the bolt 33 is larger than the cross-section area of the through hole 21c of the compressor case 11 in this embodiment. The intermediate part 33b of the bolt 33 is a portion between a thread part 33c and a head part 33a which are tip end parts of the bolt 33.

In this embodiment, like the second embodiment, the gasket 40A shown in FIG. 8 and FIG. 9 is used instead of the gasket 40 of FIG. 2.

The other configuration of the electric compressor 1 of this embodiment, except for the plural bolts 33 and the gasket 40A, are the same as that of the first embodiment.

Figure 14:
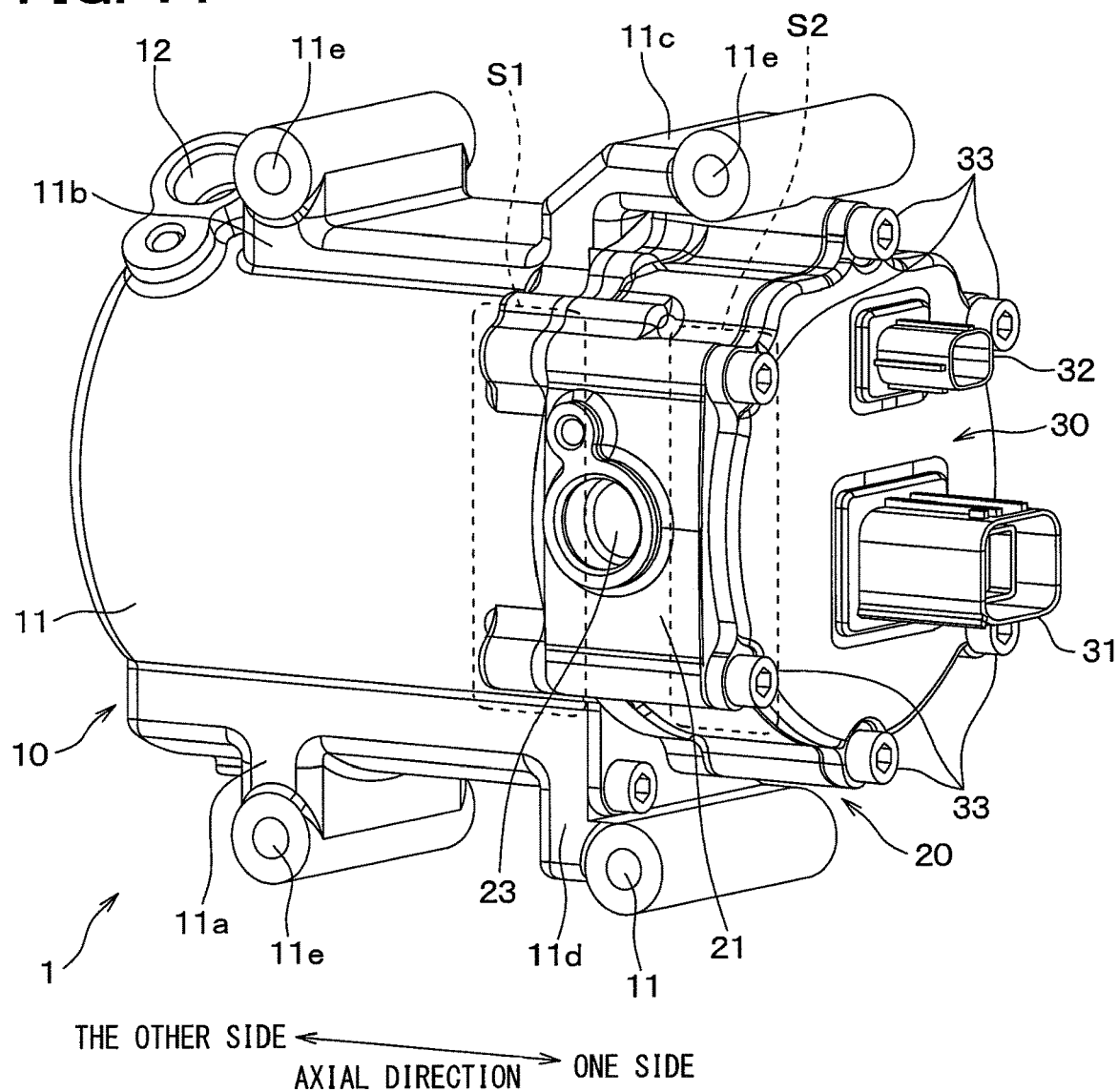
FIG. 14 is a perspective view illustrating an electric compressor for a vehicle according to a fourth embodiment.
Figure 16:
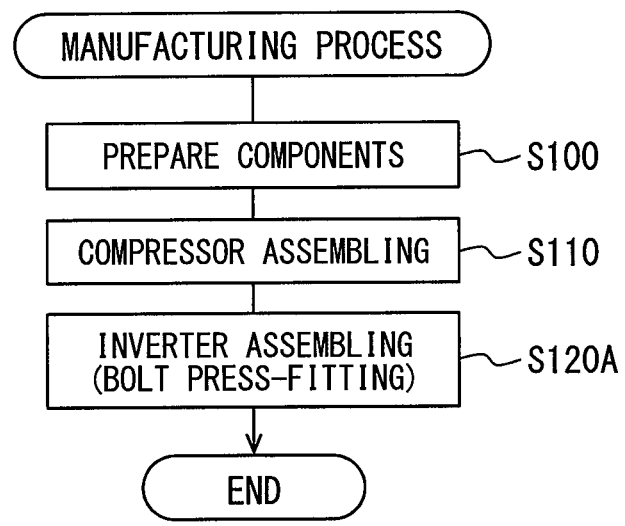
FIG. 16 is a flow chart illustrating a method of manufacturing an electric compressor for a vehicle according to a fifth embodiment.
Figure 17:
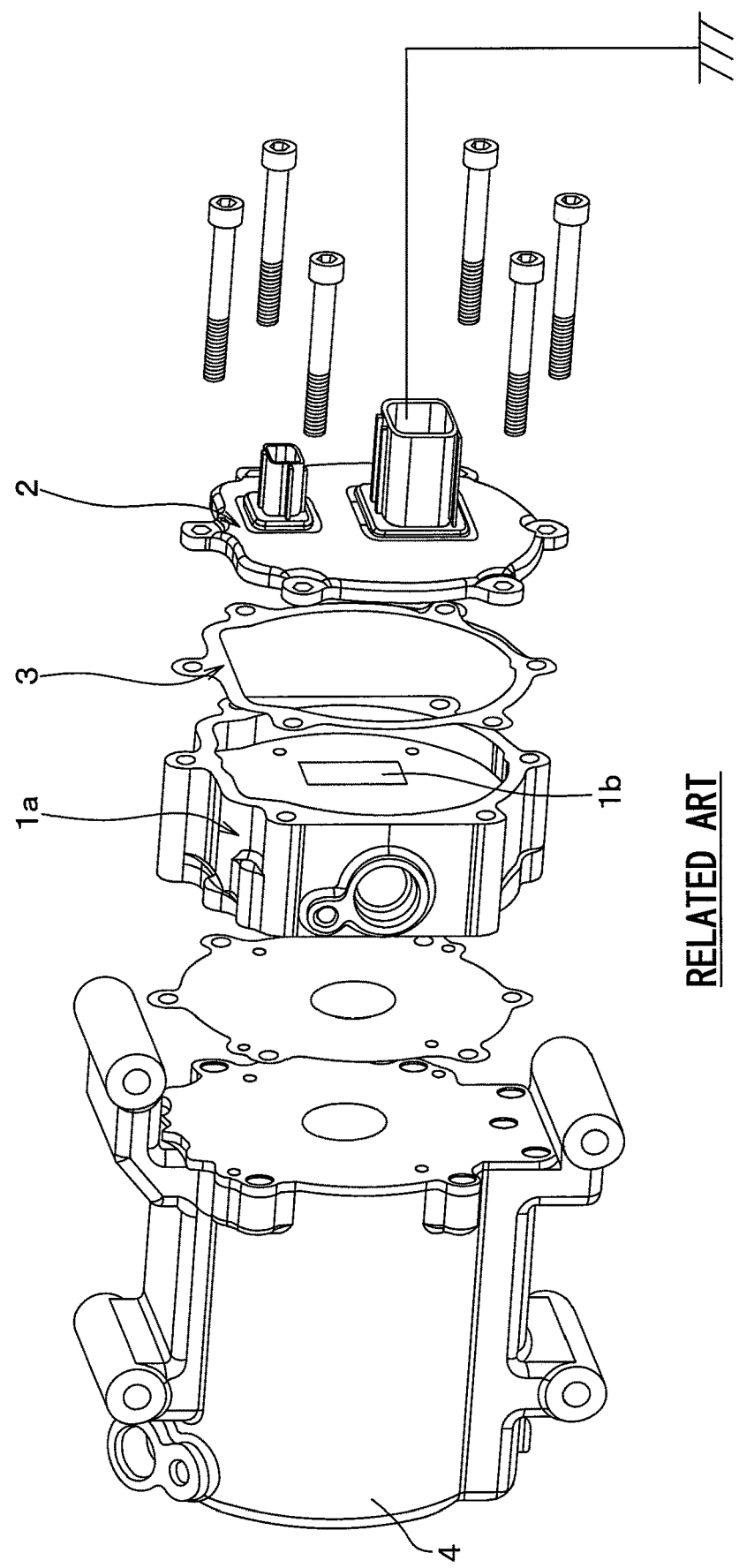
FIG. 17 is a perspective view illustrating an electric compressor for a vehicles in a comparative example.

Next, the production method of the electric compressor 1 of this embodiment is explained with reference to FIG. 14. In FIG. 16, the explanation is omitted for the same processing step as FIG. 5.

First, in Steps 100 and 110, the first process and the second process are carried out like the first embodiment.

In the third process Step 120, the plate 13 and the gasket 14 are arranged between the compressor case 11 and the inverter case 21. Further, the inverter circuit 24 is fixed in the inverter case 21. Furthermore, the gasket 40A and the lid 30 are arranged to one side in the axial direction to the inverter case 21.

In addition, the plural bolts 33 are made to pass through the through holes 21c of the lid 30, the through holes 40a of the gasket 40, the through holes 21c of the inverter case 21, the through holes 14b of the gasket 14, and the through holes 13b of the plate 13. In this state, the plural bolts 33 are fastened to the compressor case 11.

At this time, when the plural bolts 33 are inserted in the plural through-hole formation parts 21e of the inverter case 21 respectively, the intermediate part 33b of the bolt 33 elastically deforms the through-hole formation part 21e of the inverter case 21. For this reason, the intermediate part 33b of the bolt 33 increases the cross-section area of the through hole 21c.

Thereby, the intermediate part 33b of the bolt 33 is in contact with the inner circumference surface of the through-hole formation part 21e of the inverter case 21. Thereby, the press-fit structure is formed where the bolts 33 are press-fitted into the through-hole formation parts 21e of the inverter case 21.

Therefore, the plural bolts 33 can fix the lid 30, the gasket 40, the inverter case 21, the gasket 14, and the plate 13 to the compressor case 11. In this state, the intermediate part 33b of the bolt 33 is in contact with the through-hole formation part 21e of the inverter case 21, the head part 33a of the bolt 33 is in contact with the lid 30, and the thread part 33c of the bolt 33 is in contact with the compressor case 11.

In the electric compressor 1 of this embodiment, when the inverter circuit 24 supplies the three-phase alternating current flowing through the electric motor 12a, the electromagnetic wave noise propagating from the inverter circuit 24 to the inverter case 21 is transmitted to the ground of vehicle through the plural bolts 33 and the compressor case 11.

Alternatively, the electromagnetic wave noise propagating from the inverter case 21 through the inverter case 21 is transmitted to the ground of vehicle through the plural bolts 33 and the lid 30.

Thus, the electromagnetic wave noise propagating from the inverter circuit 24 to the inverter case 21 can be absorbed by the ground of vehicle through the plural bolts 33, without using a gasket made of conductive rubber.

In this embodiment, the gasket 40A having the metal support part 41a between the rubber part 42a and 42b is adopted like the second embodiment. The same effect as the second embodiment is acquired.

Other Embodiment (1) The gasket 40 of the first embodiment has the rubber part 42 arranged along the perimeter of the electrical connection part 41. Alternatively, the rubber part 42 in the gasket 40 may be positioned at the inner circumference side of the electrical connection part 41.

(2) The inverter case 21 and the compressor case 11 are welded in the fourth embodiment. Alternatively, the junction may be defined by a brazing part at which the inverter case 21 and the compressor case 11 are joined with each other by brazing. Similarly, the junction may be defined as a brazing part at which the inverter case 21 and the lid 30 are joined with each other by brazing.

(3) Each of the junctions S1, S2 is formed by welding in the fourth embodiment. Alternatively, only one of the junctions S1, S2 may be formed by welding.

Furthermore, one of the junctions S1, S2 may be formed by brazing.

(4) In the third, fourth, and fifth embodiments, the electrical connection is achieved between the lid 30 and the plural bolts 33, and the electrical connection is achieved between the compressor case 11 and the plural bolts 33. Alternatively, the electrical connection may be achieve between one of the lid 30 and the compressor case 11 and the plural bolts 33.

(5) In the second, third, fourth, and fifth embodiments, the gasket 40A is used. Alternatively, the gasket 40A of the first embodiment may be used.

(6) In the fifth embodiment, when the plural bolts 33 are made to pass through the plural through-hole formation parts 21e of the inverter case 21, the intermediate part 33b of the bolt 33 elastically deforms the through-hole formation part 21e of the inverter case 21, but is not limited to this.

Namely, when the plural bolts 33 are made to pass through the plural through-hole formation parts 21e of the inverter case 21, the through-hole formation part 21e of the inverter case 21 may elastically deform and compress the intermediate part 33b of the bolt 33.

(7) It should be appreciated that the present disclosure is not limited to the embodiments described above and can be modified appropriately. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

CONCLUSION

According to the first viewpoint described in a part or all of the embodiment, an electric compressor for a vehicle includes a compressor case, an inverter circuit, and an inverter case. The electric compressor includes a lid made of conductive metal material and closing the opening of the inverter case, and a seal component interposed between the inverter case and the lid to seal gap between the inverter case and the lid. The electric compressor includes a conductive component which transmits an electromagnetic wave noise, that is propagating from the inverter circuit to the inverter case when the inverter circuit provides the electric current flowing through the electric motor, from the inverter case to at least one of the compressor case and the lid.

According to the second viewpoint, the seal component is made of material having electrical insulation properties, and has a ring shape surrounding the opening. The conductive component has a ring shape surrounding the opening, and is arranged at an inner side of the seal component, or an outer side of the seal component to achieve the electrical connection between the inverter case and the lid. The electromagnetic wave noise from the inverter case is transmitted from the conductive component to the lid.

Thereby, the electrical connection between the inverter case and the lid can be achieved by the gasket.

According to the 3rd viewpoint, the inverter case has an inlet port through which refrigerant flows in, and a refrigerant channel that introduces the refrigerant from the inlet port into the compressor case. The inverter circuit is cooled with the refrigerant in the refrigerant channel. The electric compressor further includes: a gasket interposed between the inverter case and the compressor case to seal gap between the inverter case and the compressor case, the gasket having a channel through which the refrigerant flows from the refrigerant channel of the inverter case into the compressor case; and a joint bolt that fixes the lid, the seal component, the inverter case, and the gasket to the compressor case.

Thereby, since the conductive component is supported between the inverter case and the lid, the seal component is restricted from being elastically deformed. For this reason, excessive axial tension is not needed for fixing the lid, the seal component, and the inverter case to the compressor case using the joint bolt.

According to the 4th viewpoint, the inverter case has an inlet port through which refrigerant flows in, and a refrigerant channel that introduces the refrigerant from the inlet port into the compressor case, the inverter circuit being cooled with the refrigerant in the refrigerant channel. The electric compressor further includes a gasket interposed between the inverter case and the compressor case to seal a gap between the inverter case and the compressor case. The gasket has a channel through which the refrigerant flows from the refrigerant channel of the inverter case into the compressor case. The conductive component includes an electrical connection bolt (50) that fixes the compressor case and the inverter case to achieve electrical connection between the compressor case and the inverter case. The electromagnetic wave noise from the inverter case is transmitted from the electrical connection bolt to the compressor case.

Thereby, the electrical connection between the compressor case and the lid can be achieved using the electrical connection bolt.

According to the 5th viewpoint, the inverter case has an inlet port through which refrigerant flows in, and a refrigerant channel that introduces the refrigerant from the inlet port into the compressor case, the inverter circuit being cooled with the refrigerant in the refrigerant channel. The electric compressor further includes a gasket interposed between the inverter case and the compressor case to seal a gap between the inverter case and the compressor case. The gasket has a channel through which the refrigerant flows from the refrigerant channel of the inverter case to the compression mechanism within the compressor case. The conductive component includes a joint bolt made of a conductive metal material. The joint bolt passes through a through hole of the inverter case to define a press-fit structure. The joint bolt fixes the lid, the seal component, the inverter case, and the gasket to the compressor case in a state where the joint bolt is in contact with at least one of the lid and the compressor case. The electromagnetic wave noise from the inverter case is transmitted from the joint bolt to the at least one of the lid and the compressor case.

Thereby, the electrical connection between at least one of the lid and the compressor case and the inverter case can be achieved using the joint bolt.

According to the 6th viewpoint, an electric compressor for a vehicle includes a compressor case, an inverter case, a lid, a seal component, and a joint bolt. The compressor case is made of a conductive metal material and having a pipe shape, the compressor case housing a compression mechanism which draws, compresses and discharges refrigerant, and an electric motor which drives the compression mechanism. The inverter circuit drives the electric motor with electric current. The inverter case is made of a conductive metal material and arranged on one side of the compressor case in an axial direction, the inverter case having a storage part that houses the inverter circuit and an opening open on one side in the axial direction. The lid is made of a conductive metal material, and closes the opening of the inverter case. The seal component is interposed between the inverter case and the lid to seal a gap between the inverter case and the lid. The joint bolt is made of a conductive metal material, and fixes the lid, the seal component, and the inverter case to the compressor case in a state where the joint bolt is in contact with at least one of the lid and the compressor case. The inverter case has a swaging holding part in contact with the joint bolt. The electromagnetic wave noise from the inverter case is transmitted from the swaging holding part to the at least one of the lid and the compressor case through the joint bolt.

Thereby, the electrical connection between at least one of the lid and the compressor case and the inverter case can be achieved using the swaging holding part.

According to the 7th viewpoint, an electric compressor for a vehicle includes: a compressor case made of a conductive metal material and having a pipe shape, the compressor case housing a compression mechanism which draws, compresses and discharges refrigerant, and an electric motor which drives the compression mechanism; an inverter circuit that drives the electric motor with electric current; an inverter case made of a conductive metal material and arranged on one side of the compressor case in an axial direction, the inverter case having a storage part that houses the inverter circuit and an opening open on one side in the axial direction; a lid made of a conductive metal material, the lid closing the opening of the inverter case; a seal component interposed between the inverter case and the lid to seal a gap between the inverter case and the lid; a joint bolt made of a conductive metal material, the joint bolt fixing the lid, the seal component, and the inverter case to the compressor case in a state where the joint bolt is in contact with at least one of the lid and the compressor case; and a junction having a brazing part or a welding part at which the inverter case is joined to at least one of the compressor case and the lid, wherein the electromagnetic wave noise propagating from the inverter circuit to the inverter case, when the inverter circuit provides the electric current through the electric motor, is transmitted through the junction to the at least one of the lid and the compressor case.

Thereby, the electrical connection between at least one of the lid and the compressor case and the inverter case can be achieved using the junction.

According to the 8th viewpoint, the electric compressor includes a metal component interposed between the inverter case and the lid. The metal component has a ring shape surrounding the opening and being made of metal material. The seal component is made of a material having electrical insulation properties, and has a ring shape surrounding the opening, the seal component being arranged to one side or the other side of the metal component in the axial direction.

Thereby, since the metal component is supported between the inverter case and the lid, the seal component can be restricted from being elastically deformed. For this reason, excessive axial tension is not needed for fixing the lid, the seal component, and the inverter case to the compressor case using the joint bolt.

According to the 9th viewpoint, in the manufacturing method of the electric compressor for a vehicle, the electric compressor includes a compressor case, an inverter circuit, an inverter case, a lid, a gasket, and a joint bolt. The compressor case is made of a conductive metal material and has a pipe shape. The compressor case houses a compression mechanism which draws, compresses and discharges refrigerant, and an electric motor which drives the compression mechanism. The inverter circuit drives the electric motor with electric current. The inverter case is made of a conductive metal material and arranged on one side of the compressor case in an axial direction. The inverter case has a storage part that houses the inverter circuit and an opening open on one side in the axial direction. The lid is made of a conductive metal material, and closes the opening of the inverter case. The gasket has a seal component and a conductive component. The seal component is interposed between the inverter case and the lid to seal a gap between the inverter case and the lid. The conductive component is made of a conductive metal material and has a ring shape surrounding the opening. The conductive component is arranged between the inverter case and the lid at an inner side or an outer side of the seal component to achieve electrical connection between the inverter case and the lid. The joint bolt fixes the lid, the gasket, and the inverter case to the compressor case.

The manufacturing method includes preparing the lid, the gasket, the inverter case, the joint bolt, and the compressor case. The manufacturing method includes fixing the lid, the gasket, and the inverter case to the compressor case with the joint bolt such that the conductive component and the inverter case are in contact with each other and that the conductive component and the lid are in contact with each other.

Thereby, the production method of the electric compressor can be offered, in which the electromagnetic wave noise propagating through the inverter case from the inverter circuit can be suitably absorbed by the ground of vehicle, by connecting the compressor case and the lid to the ground of vehicle.

According to the 10th viewpoint, the manufacturing method of the electric compressor includes preparing the lid, the seal component, the inverter case, the joint bolt, and the compressor case, and assembling the lid, the seal component, and the inverter case to the compressor case. The assembling includes joining the inverter case to at least one of the compressor case and the lid by welding or brazing.

Thereby, the production method of the electric compressor can be offered, in which the electromagnetic wave noise propagating through the inverter case from the inverter circuit can be suitably absorbed by the ground of vehicle, by connecting the compressor case and the lid to the ground of vehicle.

According to the 11th viewpoint, the manufacturing method of the electric compressor includes preparing an electrical connection bolt made of a conductive metal material, the lid, the seal component, the inverter case, the joint bolt, and the compressor case. The manufacturing method includes assembling the lid, the seal component, and the inverter case to the compressor case. The assembling includes fixing the compressor case and the inverter case with the electrical connection bolt to achieve electrical connection between the compressor case and the inverter case.

Thereby, the production method of the electric compressor can be offered, in which the electromagnetic wave noise propagating through the inverter case from the inverter circuit can be suitably absorbed by the ground of vehicle, by connecting the compressor case and the lid to the ground of vehicle.

According to the 12th viewpoint, the production method of the electric compressor includes preparing the inverter case, the lid, the seal component, the compressor case, the gasket, and the joint bolt. The manufacturing method includes fixing the lid, the seal component, the inverter case, and the gasket to the compressor case with the joint bolt in a state where the joint bolt is press-fitted in a through hole of the inverter case, thereby the inverter case and the joint bolt are in contact with each other, and that at least one of the compressor case and the lid, and the joint bolt are in contact with each other.

Thereby, the production method of the electric compressor can be offered, in which the electromagnetic wave noise propagating through the inverter case from the inverter circuit can be suitably absorbed by the ground of vehicle, by connecting the compressor case and the lid to the ground of vehicle.

According to the 13th viewpoint, the manufacturing method of the electric compressor includes preparing the inverter case, the lid, the seal component, the compressor case, the gasket, and the joint bolt. The manufacturing method includes fixing the lid, the seal component, the inverter case, and the gasket to the compressor case with the joint bolt passing through the through hole (21c) of the inverter case, thereby at least one of the compressor case and the lid is in contact with the joint bolt. The manufacturing method includes fixing the inverter case to the joint bolt by swaging such that the inverter case is in contact with the joint bolt.

Thereby, the production method of the electric compressor can be offered, in which the electromagnetic wave noise propagating through the inverter case from the inverter circuit can be suitably absorbed by the ground of vehicle, by connecting the compressor case and the lid to the ground of vehicle.

What is claimed is:

1. An electric compressor for a vehicle comprising:
a compressor case made of a conductive metal material and having a pipe shape, the compressor case housing a compression mechanism which draws, compresses and discharges refrigerant, and an electric motor which drives the compression mechanism;
an inverter circuit that drives the electric motor with electric current;
an inverter case made of a conductive metal material and arranged on one side of the compressor case in an axial direction, the inverter case having a storage part that houses the inverter circuit and an opening open on one side in the axial direction;
a lid made of a conductive metal material, the lid closing the opening of the inverter case;
a seal component interposed between the inverter case and the lid to seal a gap between the inverter case and the lid; and
a conductive component which transmits an electromagnetic wave noise, that is propagating from the inverter circuit to the inverter case when the inverter circuit provides the electric current flowing through the electric motor, from the inverter case to at least one of the compressor case and the lid
wherein,
the seal component is made of material having electrical insulation properties, and has a ring shape surrounding the opening,
the conductive component has a ring shape surrounding the opening, and is arranged at an inner side or an outer side of the seal component to achieve electrical connection between the inverter case and the lid,
the seal component is joined to the conductive component, and
the electromagnetic wave noise from the inverter case is transmitted from the conductive component to the lid.

2. The electric compressor according to claim 1, wherein the inverter case has an inlet port through which refrigerant flows in, and a refrigerant channel that introduces the refrigerant from the inlet port into the compressor case, the inverter circuit being cooled with the refrigerant in the refrigerant channel,
the electric compressor further comprising:
a gasket interposed between the inverter case and the compressor case to seal a gap between the inverter case and the compressor case, the gasket having a channel through which the refrigerant flows from the refrigerant channel of the inverter case into the compressor case; and
a joint bolt that fixes the lid, the seal component, the inverter case, and the gasket to the compressor case.

3. A method for manufacturing the electric compressor according to claim 1, the electric compressor further including:
a gasket having
the seal component interposed between the inverter case and the lid to seal the gap between the inverter case and the lid, and
the conductive component made of a conductive metal material and arranged between the inverter case and the lid; and
a joint bolt that fixes the lid, the gasket, and the inverter case to the compressor case,
the method for manufacturing the electric compressor comprising:
preparing the lid, the gasket, the inverter case, the joint bolt, and the compressor case, and
fixing the lid, the gasket, and the inverter case to the compressor case with the joint bolt such that the conductive component and the inverter case are in contact with each other and that the conductive component and the lid are in contact with each other.

4. The electric compressor according to claim 1, wherein a gasket is integrally formed with the seal component and the conductive component, and the gasket is pressed between the lid and the inverter case.

5. The electric compressor according to claim 4, wherein a joint bolt fixes the gasket and the inverter case to the compressor case, and the joint bolt passes through a through hole defined at the conductive component.

6. The electric compressor according to claim 1, wherein the seal component has no through hole for a joint bolt passing through the lid, the conductive component and the inverter case.

7. The electric compressor according to claim 1, wherein the seal component is integrally formed with the conductive component.

8. The electric compressor according to claim 1, wherein the conductive component has a circumferential ring shape entirely surrounding the opening.

\* \* \* \* \*